United States Patent

Griffin

[11] Patent Number: 5,932,109
[45] Date of Patent: *Aug. 3, 1999

[54] PLATING RINSE WATER TREATMENT

[75] Inventor: Gus Griffin, Buckner, Ky.

[73] Assignee: Griffin Chemical Company, Buckner, Ky.

[*] Notice: This patent is subject to a terminal disclaimer.

[21] Appl. No.: 08/253,167

[22] Filed: Jun. 2, 1994

[51] Int. Cl.$^6$ ..................................................... C02F 1/62
[52] U.S. Cl. ................... 210/709; 204/237; 204/DIG. 13; 205/100; 210/712; 210/720; 210/743; 210/96.1; 210/101; 210/167; 210/195.1; 210/206; 210/207; 210/724; 210/913
[58] Field of Search ................... 204/237, DIG. 13; 205/100; 210/709, 720, 96.1, 743, 143, 195.1, 205, 207, 208, 209, 712, 724, 85, 101, 167, 206, 519, 913

[56] References Cited

U.S. PATENT DOCUMENTS

| | | | |
|---|---|---|---|
| 3,542,651 | 11/1970 | Yagishita | 210/913 |
| 3,658,470 | 4/1972 | Zievers et al. | 205/100 |
| 3,681,210 | 8/1972 | Zievers et al. | 205/100 |
| 3,714,039 | 1/1973 | Lancy et al. | 210/743 |
| 3,826,741 | 7/1974 | Nakamure | 210/709 |
| 3,835,045 | 9/1974 | Hussissian | 210/709 |
| 3,973,987 | 8/1976 | Hewitt et al. | 134/12 |
| 4,170,554 | 10/1979 | Freshcorn | 210/720 |
| 4,171,255 | 10/1979 | Tuznik et al. | 204/DIG. 13 |
| 4,367,213 | 1/1983 | Fiorucci et al. | 210/720 |
| 4,379,031 | 4/1983 | Krotkiewicz et al. | 204/194 |
| 5,256,306 | 10/1993 | Griffin | 210/720 |

FOREIGN PATENT DOCUMENTS

| | | | |
|---|---|---|---|
| 197806 | 6/1978 | Germany | 204/DIG. 13 |
| 998365 | 2/1983 | U.S.S.R. | 210/720 |

*Primary Examiner*—Peter A. Hruskoci
*Attorney, Agent, or Firm*—David W. Carrithers; Carrithers Law Office

[57] ABSTRACT

Method and apparatus for handling water used in plating processes to eliminate discharge of pollutants including a plating tank for chrome plating selected materials, at least one rinse tank which holds rinse water where parts from the plating tank are rinsed to remove chrome compounds used in the plating tank and transfer means to transfer water from the rinse tank to a purification tank where hydrazine is added to the rinse water in quantities sufficient to maintain selected pH in the water returned to one of the rinse tanks for precipitation of the chromic compounds to chromic hydroxide which can be easily filtered for disposal as a dry material. High quality water such as deionized water is added to the rinse tank to makeup lost water and a catalyst such as cobalt salt can be added to the purification tank to assist in reduction of the chromic compounds.

13 Claims, 1 Drawing Sheet

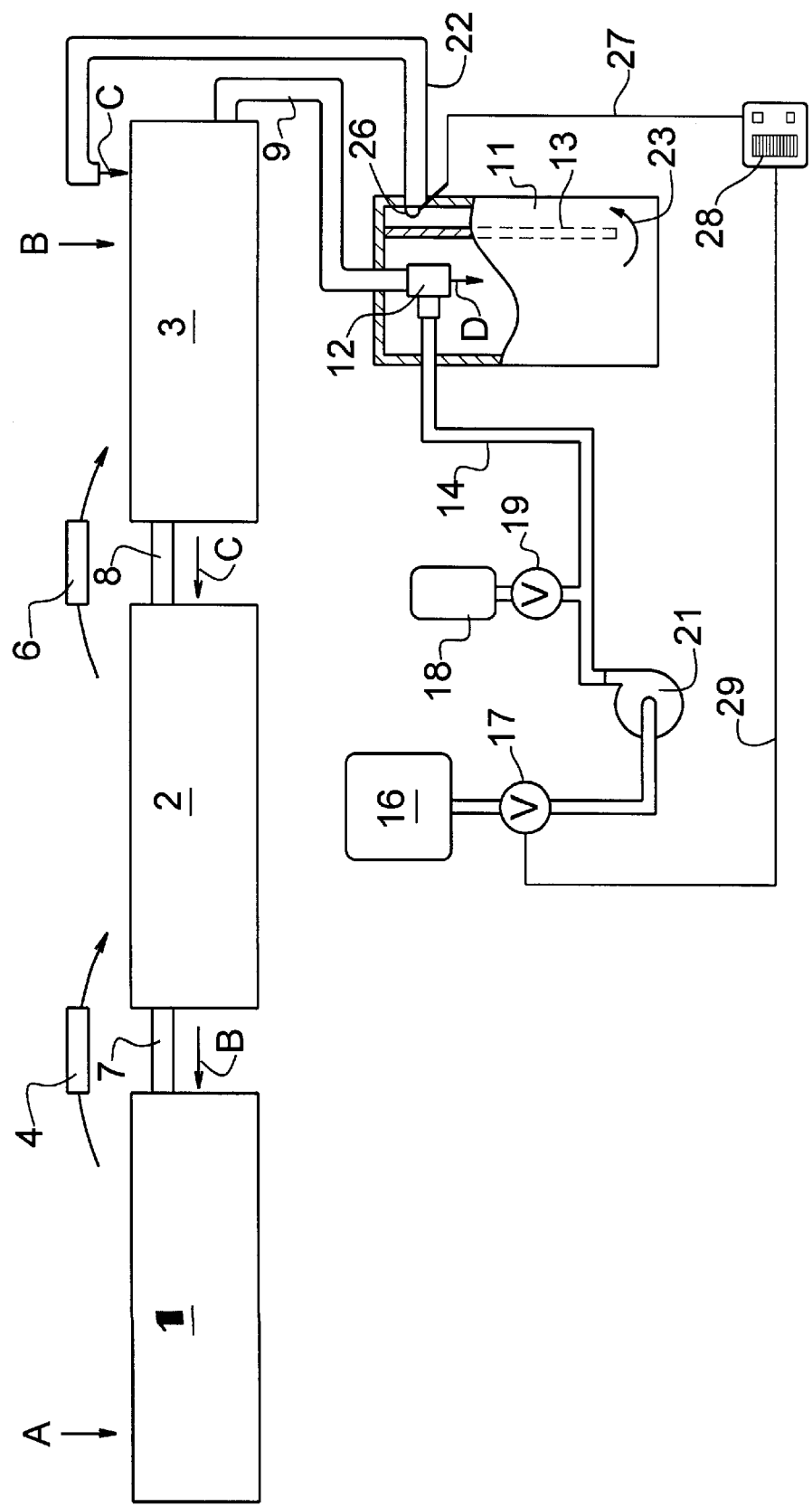

PLATING RINSE WATER TREATMENT

BACKGROUND OF THE INVENTION

The present invention relates to method and apparatus for treatment of industrial waste water and particularly to methods and apparatus for safe effective removal of chromium compounds from effluent from chrome plating processes. The Chromic acid which is normally encountered in plating processes is considered toxic and since it is removed from the plated parts in a rinse station the rinse water must be treated prior to introduction to sewage systems.

In most cases the prior art has provided for such chromic acid bearing rinse water to be treated with chemical reducing agents followed by treatment with alkaline material to form a solid precipitate which can then be more easily handled for disposal and allows the water to be discharged to sewage systems or otherwise disposed of.

Typically, the removal is controlled by the oxidation-reduction potential of the system. In the first step, the pH of the rinse water is lowered to a selected range by introduction of an acid followed by reduction by a sulfite and hydroxide to increase the pH to precipitate the chromium as a hydroxide salt. Such procedures have required at least three vessels, two pH meters, and a oxidation-reduction potential monitor.

Such prior art methods and apparatus are labor intensive because of the multiple steps required and expensive because of the equipment and chemicals required. Further, the prior art methods are at best only marginally effective and the multiple step operation is subject to error and inadvertent emission of toxic material.

Moreover the prior art methods are not capable of conversion to effective procedures for continuous processing of rinse water and return of the water to the process so there is no liquid discharge from the process.

My U.S. Pat. No. 5,256,306 teaches treatment of such rinse water with hydrazine and a cobalt catalyst for safe removal of the chromic acid. The present invention is an improvement on the teaching of my prior Patent.

No prior art method is known which allows continuous treatment of rinse water from a chrome plating process with no liquid discharge from the rinse water treating apparatus.

SUMMARY OF THE INVENTION

The present invention presents a new and useful procedure and apparatus for treatment of water used in chrome plating operations. More particularly the present invention provides a new and advantageous method and apparatus to unexpectedly allow continuous operation of plating processes which eliminates liquid discharge from the process.

The method and apparatus provided by the present invention eliminates the multiple batch procedures required by the prior art and the multiple testing which is subject to error and inadvertent release of effluent from the operation.

Methods in accordance with the present invention include demineralized water in the baths and rinses and a nonionic reducing agent in chromium removal. For example addition of approximately stoichiometric amounts of hydrazine to the chromic acid of the rinse water at selected pH where it has been found that the concentration of chromic acid is virtually reduced to "0" by reduction of the chromic acid to chromic hydroxide which is a precipitate and can be removed from the processing tank as a solid.

The pH can be controlled in the range of 7 but it has also been found that a slight increase in the pH to 8–9 assures complete precipitation of the chromic hydroxide.

It has been further found as described in my previously noted patent that small amounts of cobalt salt act as a catalyst and enhance the removal process.

Briefly, the present invention provides method and apparatus for handling water used in plating processes to eliminate discharge of pollutants including a first plating tank for chrome plating selected materials, at least one rinse tank which holds rinse water where parts from the plating tank are rinsed to remove chrome compounds used in the plating tank and transfer means to transfer water from the rinse tank to a purification tank where hydrazine is added to the rinse water in quantities sufficient to maintain selected pH in the water returned to one of the rinse tanks for precipitation of the chromic compounds to chromic hydroxide which can be easily filtered for disposal as a dry material. High quality water such as deionized water is added to the rinse tank to makeup lost water and a catalyst such as cobalt salt can be added to the purification tank to assist in reduction of the chromic compounds.

Examples of arrangements within the scope of the present invention are illustrated in the drawings and descriptions provided hereinafter but it will be understood that the examples are presented by way of illustration only and that other arrangements and procedures also within the scope of the present invention will occur to those skilled in the art upon reading the disclosure set forth hereinafter.

BRIEF DESCRIPTION OF THE DRAWING

The FIGURE illustrates one example of apparatus within the scope of the present invention for use in procedures within the scope of the present invention.

DETAILED DESCRIPTION OF THE INVENTION

Referring now to the FIGURE a plating tank 1 as generally known in the art is shown to receive items A to be plated. Additional plating solution is added to the tank as needed as is known in the art.

The plated parts 4 are transferred from the plating tank 1 to a first rinse tank 2 for first stage removal of chromic acid. The parts 6 can then be transferred to a second rinse tank 3 as shown. While two or more rinse tanks are preferred in the arrangement shown it will be understood that other arrangements can be utilized within the scope of the present invention.

It will be recognized that water is lost from the rinse and plating tanks by various means but principally evaporation and that the lost water must be madeup. In accordance with the example of the present invention shown in the FIGURE the makeup water B is added to the second rinse tank 3 and can advantageously be deionized water.

The water in the final rinse tank 3 is transferred to a mixing tee in a chromium removal tank 11 where hydrazine from a tank 16 is supplied through a control valve 17 to mixing tee 12 where the hydrazine reacts with the chromic acid in the water to form chromium hydroxide which precipitates and can be removed from the tank as required. The hydrazine is supplied by pump 21 and a selected amount of a catalyst such as a cobalt salt from a supply tank 18 can be added to enhance the reaction of the hydrazine and the chromic acid. a baffle 13 can be provided in tank 11 so water flowing to the outlet must pass under the baffle as shown at reference numeral 23 to increase residence time if needed for complete reaction of the chromic acid and hydrazine.

It has been found that the pH of the solution in the tank plays a significant role in the complete removal of chromium in the water returned to tank 3 and that by maintaining the pH in the range of 8–9 virtually complete removal of chromium is achieved.

To this end, a pH electrode 26 can be provided as shown in the tank 11 and particularly at the outlet of the tank where the water is returned through conduit 22 to tank 3 to continuously monitor pH. The signal from pH electrode 26 is supplied to a controller 28 which control operation of valve 17, or adjust pump speed, to modulate flow of hydrazine to maintain the desired pH in the return water.

In accordance with the example of the present invention shown in the FIGURE the water C is returned to tank 3 so that water is then returned from tank 3 to tank 2.

In turn, water C is then returned to tank 2 if needed and water B is returned from tank 2 to the plating tank 1 if needed. The returning water always has a lower chromium level than the level in the receiving tank so chromium level is maintained at low levels in the tanks and particularly in tanks 2 and 3.

Consequently, it can be seen that the levels of chromium can be maintained at desired level in the system without excessive accumulation and without the need to remove chromium bearing solution from the system.

It will be understood that the foregoing are examples are not by way of limitation and that other arrangements also within the scope of the present invention will occur to those skilled in the art upon reading the disclosure set forth hereinbefore.

The invention claimed is:

1. A waste water treatment system to eliminate discharge of pollutants from continuous plating process waste water, said system comprising:

a plating tank for chrome plating parts with chromium compounds;

a first rinse tank for holding a first rinse water containing a first low concentration level of residual chromium compounds for rinsing said chrome plated parts transferred from said plating tank to remove residual chromium compounds used for plating said chrome plated parts in said plating tank;

a second rinse tank for holding a second rinse water containing a second low concentration level of residual chromium compounds for rinsing said chrome plated parts transferred from said first rinse tank for further removing residual chromic compounds from said chrome plated parts, said second low concentration being less than said first low concentration;

means to selectively add makeup water to said second rinse tank;

transfer means to transfer said second rinse water from said second rinse tank to said first rinse tank;

a chromium removal purification tank having an inlet means to receive said second rinse water from said second rinse tank and a purified rinse water outlet;

transfer means to transfer said second rinse water from said second rinse tank to a mixing tee in said purification tank inlet;

hydrazine supply means to supply hydrazine to said mixing tee in said purification tank in quantities sufficient to precipitate residual chromium compounds in said second rinse water as chromium hydroxide and maintain a selected pH in said purified rinse water;

a valve for controlling the hydrazine supply to said mixing tee;

means for supplying a selected amount of a catalyst to said mixing tee to assist in reducing said chromium compounds; and transfer means to return said purified rinse water to said second rinse tank means.

2. The system of claim 1 including a pH sensor to monitor the pH of said purified rinse water.

3. The system of claim 3, including controller means to receive a signal from said pH sensor and control supply of said hydrazine to said purification tank in response thereto for maintaining the pH of said purified rinse water.

4. The system of claim 3, wherein said pH is basic.

5. The system of claim 3 wherein said pH is maintained in the range of about 8 to about 9.

6. The system of claim 1, wherein a cobalt salt is added as a catalyst to assist in reduction of said chromium compounds.

7. The system of claim 1, wherein said makeup water is deionized water.

8. The system of claim 1, wherein said purification tank includes a baffle for increasing the residence time of said chromium compound and said hydrazine.

9. The system of claim 1, wherein said chromium compounds include chromic acid.

10. The system of claim 1, including at least one additional rinse tank included between said second rinse tank and said purification tank.

11. The system of claim 10, wherein makeup water is added to the additional rinse tank positioned before said purification tank.

12. A waste water treatment process for eliminating discharge of pollutants from waste water in a continuous plating process, comprising the steps of:

chrome plating parts with chromium compounds in a chrome plating tank producing chrome plated parts;

rinsing said chrome plated parts transferred from said plating tank in a first rinse tank holding a first rinse water containing a first low concentration level of residual chromium compounds for removing residual chromium compounds from said chrome plated parts;

rinsing said chrome plated parts in a second rinse tank containing a second low concentration level of residual chromium compounds for further removing residual chromic compounds from said chrome plated parts, said second low concentration being less than said first low concentration;

selectively adding makeup water to said second rinse tank;

transferring a selected portion of said second rinse water from said second rinse tank to said first rinse tank;

transferring a selected portion of said second rinse water from said second rinse tank to a mixing tee in a chromium removal purification tank;

supplying a controlled quantity of hydrazine to said second rinse water in said mixing tee for reacting said hydrazine with said residual chromium compounds in quantities sufficient to precipitate residual chromium compounds in said second rinse water as chromium hydroxide;

supplying a selected amount of a catalyst to said mixing tee to assist in reduction of said chromium compounds and producing purified rinse water;

maintaining a selected pH in said purified rinse water; and transferring a controlled quantity of said purified rinse water to said second rinse tank.

13. The process of claim 12, wherein said catalyst is a cobalt salt.

* * * * *